United States Patent Office 3,516,894
Patented June 23, 1970

3,516,894
FLOOR CONSTRUCTION
David K. Slosberg, Yardley, Pa., assignor to American Biltrite Rubber Co., Inc., Trenton, N.J., a corporation of Delaware
Filed Apr. 27, 1966, Ser. No. 545,730
Int. Cl. B22b *3/10, 31/00;* E04b *15/16*
U.S. Cl. 161—39                                2 Claims

ABSTRACT OF THE DISCLOSURE

The disclosure concerns floor construction which includes a base member of wood or concrete. A laminated layer comprising a lower layer of plasticized sponge vinyl and an upper layer of acrylonitrile rubber saturated asbestos felt is adhered to the base with a hard-setting rubber latex adhesive. A wear layer of vinyl rubber or vinyl asbestos is adhered to the asbestos felt layer by an adhesive. It is also contemplated that said wear layer be in the form of a plurality of tiles or sheets.

---

The present invention relates to floor structures and methods of making the same, and is particularly concerned with a floor having a wear surface of resinous composition and also having cushioning properties.

The object of the present invention is to provide a floor structure with either a concrete or wood base, having good wear and cushioning properties and capable of construction at moderate cost.

Figure 1:
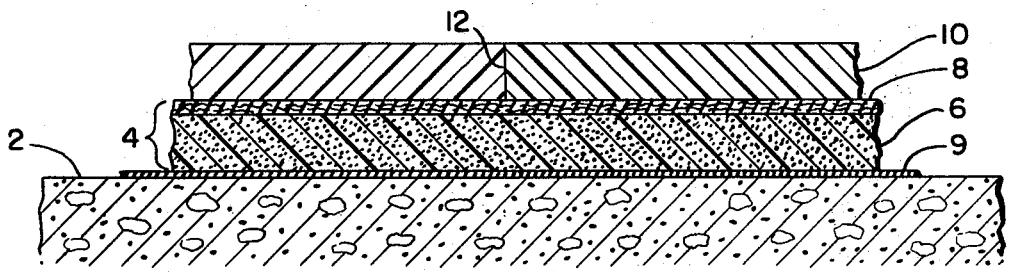
Figure 2:
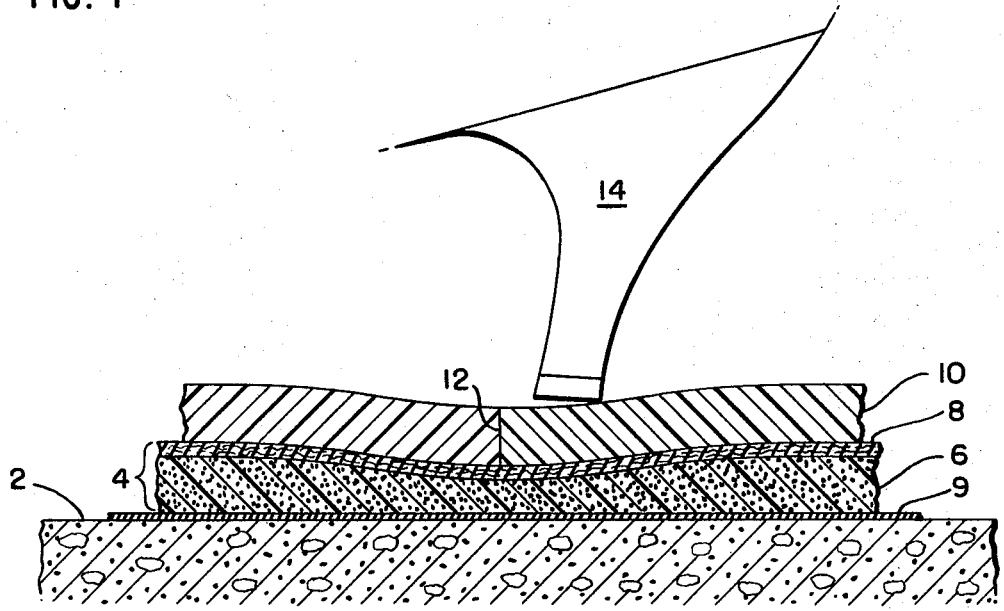

In the accompanying drawings FIG. 1 is a sectional view of the preferred form of flooring according to the present invention; and FIG. 2 is a detail view showing the flexure of a portion of the floor under impact.

In the illustrated embodiment of the invention there is shown a base 2 of concrete although this may be of any sutiable base material such as wood. Applied to the base with a suitable adhesive is a laminated cushion material 4 comprising a layer of sponge vinyl 6 bonded to a layer of asbestos felt 8. The adhesive layer 9 by which the sponge vinyl is adhered to the base 2 will be presently described.

Above the asbestos felt layer 8 is a wear layer 10 which may be in the form of either tiles or sheets. The wear layer 10 may be of vinyl rubber or vinyl asbestos, and for reasons to be presently described must be of at least a certain thickness. Joints 12 between the tiles or sheets are indicated in the drawing. It is an important feature of the present invention that no seam welding of the joints is required.

The various materials used for construction of the flooring will now be described.

First, the adhesive layer 9 by which the sponge vinyl layer 6 is caused to adhere to the base 2 is preferably a hard-setting rubber latex adhesive with a high resin content, an example of which is presently available on the market under the tradename Webtex #30. A hard setting adhesive has the desirable properties of preventing shrinkage and dimensional distortion. Alcohol-shellac adhesives are usually not suitable because of the low degree of adhesion with the smooth sponge surface, and asphalt adhesives are usually unsuitable because of the migration of plasticizer from the vinyl sponge into the asphalt.

The laminate 4 comprises the sponge vinyl layer 6 having an expansion ratio of about 4.5–1 in order to give satisfactory cushioning properties. The preferred thickness of the sponge vinyl is 0.120 inch. Laminated to the sponge vinyl layer is the asbestos felt layer 8, preferably consisting of asbestos felt saturated with acrylonitrile rubber. This asbestos felt layer serves as a medium by which the wear layer may be readily bonded without the necessity of a tie coat.

The laminate 4 is preferably prepared and stored in large sheets or rolls so that seams are kept to a minimum.

The wear layer 10 comprises any suitable hard-finished tile or sheet, usually either homogeneous vinyl or vinyl asbestos. This wear layer may be in the form of tiles or sheets, with or without a felt backing, and it is a feature of the present invention that tiles may be used, notwithstanding the large number of seams between the tiles. The wear layer material may be secured to the asbestos felt 8 by any standard adhesive.

It has been found that the wear layer must be at least ⅟₁₆″ thick, and preferably 0.080 inch or thicker. It is desirable that seams between the tiles or sheets of the wear layer should not register with the seams, if any, in the laminate layer 4 and this can be accomplished by proper layout of the floor.

In any event, the present invention, whether tiles or sheets are used in the wear layer, avoids the necessity of seam welding. The floor of the present invention is therefore distinguished from one laid with composite cushioned sheets in which the wear layer is coterminous with the underlying cushion layer. With such a floor, seam welding of joints between sheets is necessary; otherwise if one's heel struck near a seam the cushion under the heel would yield sufficiently to leave a projecting edge in the sheet on the other side of the seam. It is for this reason that composite cushion flooring cannot be used in tile form, because of the excessive labor and expense involved in welding all of the seams between tiles.

According to the present invention seam welding is not necessary since as shown in FIG. 2, if one tile, shown at the right, is depressed by a heel 14 the cushion layer 6 is depressed not only under this tile but also under the next adjacent tile (left). Therefore the cushion layer causes the edge of the left tile to flex downwardly so that it is not exposed above the edge of the right tile; in other words, the flexure of the cushion over a sufficient wide area causes the edges of the two adjacent tiles to flex down together even though the two tiles are not welded together at the seam 12. In order to attain this result it is necessary that the wear layer be of a thickness greater than a certain minimum, as described above, since a very thin tile would allow a flexure of the tile and underlying cushion over such a small area that an adjacent tile might present an exposed edge.

The present invention is not limited to tiles since the wear layers of larger sheets may be used, in which case the same advantage of avoiding seam welding is obtained.

Having thus described the invention I claim:

1. A floor construction comprising a base selected from the group consisting of wood and concrete; a laminated layer adhered to the base with a hard-setting rubber latex adhesive, the laminated layer comprising a lower layer of plasticized sponge vinyl and an upper layer of acrylonitrile rubber saturated asbestos felt bonded thereto; and a wear layer selected from the group consisting of vinyl rubber and vinyl asbestos at least ⅟₁₆ inch in thickness adhered to the asbestos felt layer by an adhesive.

2. The floor construction of claim 1 in which said wear layer comprises a plurality of individual tiles or sheets abutting each other along seams, the seams between the tiles or sheets not coinciding with seams, if any, in said laminated layer.

References Cited

UNITED STATES PATENTS

| | | | |
|---|---|---|---|
| 3,014,829 | 12/1961 | Curtin | 161—36 |
| 3,094,447 | 6/1963 | Chamberlain | 52—516 |
| 3,160,549 | 12/1964 | Caldwell et al. | 161—161 |
| 3,345,246 | 10/1967 | Sheahan | 161—161 |

WILLIAM J. VAN BALEN, Primary Examiner

U.S. Cl. X.R.

52—309; 156—71; 161—161, 165, 205

PO-1050
(5/69)

UNITED STATES PATENT OFFICE
CERTIFICATE OF CORRECTION

Patent No. 3,516,894    Dated June 23, 1970

Inventor(s) David K. Slosberg

It is certified that error appears in the above-identified patent and that said Letters Patent are hereby corrected as shown below:

In the specification, column 1, line 3, should read as follows:

David K. Slosberg, Atlanta, Ga., assignor to American

SIGNED AND
SEALED
NOV 17 1970

(SEAL)
Attest:

Edward M. Fletcher, Jr.
Attesting Officer

WILLIAM E. SCHUYLER, JR.
Commissioner of Patents